US010240390B1

(12) United States Patent
Bunyard et al.

(10) Patent No.: US 10,240,390 B1
(45) Date of Patent: Mar. 26, 2019

(54) METHOD OF INSTALLING A BOWED BARRIER SYSTEM FOR A PASSAGEWAY (71) Applicants: Edward G. Bunyard, Goodyear, AZ (US); Diana L. Bunyard, Goodyear, AZ (US)

(72) Inventors: Edward G. Bunyard, Goodyear, AZ (US); Diana L. Bunyard, Goodyear, AZ (US)

(73) Assignee: ClearPro Barriers & gates, LLC, Goodyear, AZ (US)

( * ) Notice: Subject to any disclaimer, the term of this patent is extended or adjusted under 35 U.S.C. 154(b) by 0 days.

(21) Appl. No.: 15/946,670

(22) Filed: Apr. 5, 2018

(51) Int. Cl.
*E06B 9/04* (2006.01)
*A01K 1/035* (2006.01)
*E06B 9/00* (2006.01)

(52) U.S. Cl.
CPC ............ *E06B 9/04* (2013.01); *A01K 1/035* (2013.01); *E05Y 2800/426* (2013.01); *E05Y 2900/40* (2013.01); *E06B 2009/002* (2013.01)

(58) Field of Classification Search
CPC .. A01K 1/035; E06B 9/02; E06B 9/06; E06B 9/04; E06B 2009/002; E06B 2009/005; E06B 2009/015
See application file for complete search history.

(56) References Cited

U.S. PATENT DOCUMENTS

| | | | |
|---|---|---|---|
| 2,470,921 A | 5/1949 | Dow | |
| 3,229,751 A | 1/1966 | Moorer | |
| 3,654,730 A | 4/1972 | Fraleigh | |
| 4,480,407 A | 11/1984 | Niidamu et al. | |
| 4,583,715 A | 4/1986 | Wright | |
| 4,787,174 A | 11/1988 | Brown | |
| 5,065,560 A * | 11/1991 | Yoder | E04B 2/24 52/306 |
| 5,242,207 A * | 9/1993 | Carson | B60J 1/2094 160/DIG. 2 |
| 5,269,576 A * | 12/1993 | Krebs | B60P 7/15 254/200 |
| 5,771,505 A * | 6/1998 | Reynolds | A47K 3/001 160/222 |
| 5,906,068 A | 5/1999 | Bode | |
| 5,967,215 A | 10/1999 | Needham et al. | |
| 6,219,978 B1 * | 4/2001 | Wood | E06B 9/02 292/149 |
| 6,681,523 B1 | 1/2004 | Stener | |

(Continued)

*Primary Examiner* — Gregory J Strimbu
(74) *Attorney, Agent, or Firm* — Invention to Patent Services; Alex Hobson (57) ABSTRACT

A bowed barrier extends across a passageway to prevent pets or children from moving through the passageway. The bowed barrier has a barrier panel, such as a plastic sheet, and a perimeter retainer, such as foam, that extends along the left and right sides of the barrier panel. The perimeter retainer interfaces with the sides of the passageway to retain the bowed barrier in place. The stress induced in the bowed barrier panel creates a force that retains the bowed barrier in a bowed configuration across the passageway. The convex side of the bowed barrier faces a barrier area, or area where a pet or small child may be confined to. If the child or pet pushes on the convex side of the bowed barrier the bowed barrier will increase the force against the passageway, thereby preventing the bowed barrier panel from being dislodged.

11 Claims, 6 Drawing Sheets

(56) References Cited

U.S. PATENT DOCUMENTS

| | | |
|---|---|---|
| 6,715,182 B2 | 4/2004 | Cheng et al. |
| 7,082,981 B2 | 8/2006 | Perez et al. |
| 7,658,220 B2 | 2/2010 | Yates |
| 8,511,015 B2 | 8/2013 | Behrens |
| 8,615,931 B2 | 12/2013 | Dunn |
| 8,991,470 B1 | 3/2015 | Pacheco |
| 9,127,496 B1* | 9/2015 | Flannery .................. E06B 9/06 |
| 9,234,388 B2 | 1/2016 | Altieri, Jr. |
| 9,759,011 B2 | 9/2017 | Leavitt |
| 2004/0188664 A1 | 9/2004 | Lauer et al. |
| 2006/0086057 A1* | 4/2006 | Rasenberger ............. E06B 9/02 |
| | | 52/202 |
| 2008/0173854 A1 | 7/2008 | Hoffman et al. |
| 2010/0257788 A1 | 10/2010 | McRoskey |
| 2012/0324792 A1 | 12/2012 | Bertsch |
| 2013/0248794 A1* | 9/2013 | Callahan ................. E04H 17/00 |
| | | 256/73 |
| 2014/0174006 A1* | 6/2014 | Pardue ..................... E06B 5/12 |
| | | 52/203 |
| 2014/0318721 A1 | 10/2014 | Moller-Nielsen et al. |
| 2015/0107169 A1* | 4/2015 | Scott ........................ E06B 9/02 |
| | | 52/202 |

* cited by examiner

METHOD OF INSTALLING A BOWED BARRIER SYSTEM FOR A PASSAGEWAY

BACKGROUND OF THE INVENTION

Field of the Invention

This invention relates to barriers for passageways and methods of erecting said barrier in a passageway.

Background

Passageway barriers are commonly used in homes to block off parts of the home to prevent pets and/or small children from entering. In some cases, a particular area of the home, such as the kitchen, is a designated area, or barrier area for pets. One or more barriers may be erected in passageways leading from the kitchen to keep pets within the kitchen area, for example. Since the kitchen is a commonly used area of the home, homeowners may have to remove and replace a barrier many times throughout the day. Adjustable width passageway barriers are complicated to erect and take down, which can be frustrating to the homeowners. These conventional barriers typically have one or more hinged elements that have to be aligned and then rotated into a locked position to expand the barrier or gate to secure the gate to the wall or doorway. In addition, these barriers typically have two or more rubber feet along the sides for engagement with the wall or doorway. Exerting too much force on the barrier while securing the barrier can cause these feet to damage to the wall or doorway.

SUMMARY OF THE INVENTION

The invention is directed to a bowed barrier system comprising a bowed barrier and methods of erecting said barrier in a passageway. An exemplary barrier of the present invention comprises a barrier panel and a perimeter retainer and requires no hinges or moving parts. The barrier panel may be a sheet of polymer or plastic and the perimeter retainer may be a foam configured around a portion of the perimeter of this plastic sheet. The barrier panel is simply bowed to and then placed across a passageway. The stress induced in the bowed barrier panel creates a force that retains the barrier panel in a bowed configuration across the passageway. The convex side of the bowed barrier is configured toward a barrier area, or area where a pet or small child may be confined to. If the child or pet pushes on the convex side of the bowed barrier is will increase the force of the barrier panel against the left and right supports of the passageway, thereby preventing the bowed barrier panel from being dislodged. The barrier panel may be bowed more for more narrow passageways and less for wider passageways. In addition, an exemplary barrier panel may comprise a baseboard indentation, or an indentation area along the left and right side of the barrier panel to all room for the baseboard.

An exemplary barrier panel is a self-standing piece of material that may be substantially planar, such as a sheet of polymer or plastic, having substantially parallel surfaces and may have a substantially uniform thickness between the two surfaces. An exemplary barrier panel is a sheet of polymer or plastic including, but not limited to, polycarbonate, polyethylene, polypropylene, polyester, acrylic, ABS, and the like. An exemplary barrier panel is not permeable, such as a screen, and is self-supporting or free standing, such as a solid sheet of polymer or plastic that will retain a shape when positioned vertically with the length or width extending vertically. An exemplary barrier panel may be translucent or transparent allowing the pet or child to see through the panel and the guardian to see the child or pet through the panel. Note that a pattern or image may be configured on a translucent or transparent panel to prevent pets and children from running into the panel. Note that a barrier panel need not be plastic but may also be made from metal, wood, composite materials and the like.

An exemplary barrier panel has a width that is larger than the width of the passageway and bowing the barrier panel enables the barrier to be placed and retained across the passageway. The residual stress in the bowed barrier panel, the force to elongate back to a straight sheet, creates a force along the passageway supports to secure the bowed barrier in place. An exemplary barrier panel may have a thickness that is great enough to retain a sufficient force against a passageway support but not so thick that bowing the barrier panel is exceeding difficult. An exemplary barrier panel may have a thickness of about 3 mm or more, about 5 mm or more, about 8 mm or more about 10 mm or more, about 15 mm or more, about 20 mm or more, no more than about 25 mm and any range between and including the thickness values provided, such as from about 5 mm to 20 mm A exemplary barrier panel may have a width that greater than the width of a passageway such as, about 3% greater or more, about 5% greater or more, about 7% greater or more, about 10% greater or more, about 20% greater or more and any range between and including the percentages provided. A passageway may have a width of about 60 cm or more, about 70 cm or more, about 80 cm or more, about 1 m or more, about 1.2 m or more and any range between and including the widths provided. A user may select a barrier panel with a width that is slightly greater than the width of the passageway. For example, a hallway may be about 75 cm wide and a user may select a barrier panel that is 80 cm or 90 cm wide and then bow the barrier panel to reduce the straight-line width for installation across the 75 cm wide passageway.

An exemplary barrier panel may comprise an extender portion configured on the right side and/or the left side of the barrier panel and is secured to the barrier panel by a fastener that extends through an extension slot in the barrier panel for adjustment of the width of the barrier panel. An exemplary extender portion may be made out of the same material as the barrier panel and may be a clear plastic. An extender portion may have an extension channel for receiving the left or right side of the barrier panel. The extender portion may be slide down over the side of the barrier panel or slid over the side and the fastener may be extended through the extension slot and secured by a fastener retainer, to detachably attach the extender portion to the barrier panel. The perimeter retainer may be configured on the outer edge of the extender portion. A user may attach an extender portion to the left and/or right side of the barrier panel to adjust a width for a particular passageway. An extender portion may enable an increase in width of the barrier panel of about 25 mm or more, about 50 mm or more, about 75 mm or more, about 100 mm or more, about 150 or more and any range between and including the width values provided. A extender portion may be provided to enable an exemplary bowed barrier to accommodate a range of passageway widths, such as from about 91.4 cm (36 inches) to 107 cm (42 inches), or from about 107 cm (42 inches) to 122 cm (48 inches), or from about 122 cm (48 inches) to about 137 cm (54 inches).

An exemplary barrier panel comprises a baseboard indentation to allow the left and right sides of the barrier panel to be flush and parallel with the supports of the passageway. An exemplary baseboard indentation extends from the bottom of the barrier panel up along the left and right sides. Most homes have baseboards that are no more than 15 cm tall and no more than 25 mm thick. Therefore, an exemplary baseboard indentation may have a height of about 15 cm or more, about 17.5 cm or more, about 20 cm or more, about 25 cm or more, or no more than 25 cm, and any range between and including the indentation heights provided. Likewise, an exemplary baseboard indentation may have a depth of about 15 mm or more, about 20 mm or more, about 25 mm or more, about 30 mm or more, or no more than 35 mm, and any range between and including the indentation depth provided. It is desirable that the indentation height not be too large to ensure an effective length of contact between the left and right sides of the bowed barrier and the passageway supports.

An exemplary barrier system comprises a perimeter retainer, or a contact element between the barrier panel and the passageway support. An exemplary perimeter retainer may be a softer material than the barrier panel, such as a foam, rubber or elastomer, such as silicone or urethane. An exemplary perimeter retainer may extend around a portion of the barrier panel and at least along a portion of the left and right sides of the barrier panel. In one embodiment, a perimeter retainer extends completely around the outer perimeter of the barrier panel. In an exemplary embodiment, a perimeter retainer has a perimeter channel for insertion of the barrier panel. Put another way, a perimeter retainer may extend along the outside perimeter of the barrier panel and down both surfaces of the barrier panel, some depth. Note that an exemplary perimeter retainer may only extend around the outside perimeter and may only extend down along one surface of the barrier panel. A perimeter retainer extending along a top of the barrier panel may alert a dog or child of the presence of the barrier. A perimeter retainer extending along the bottom of the barrier panel may provide additional retention force along the floor of the passageway.

A perimeter retainer may have a high coefficient of friction to prevent the bowed barrier from being dislodged. An exemplary perimeter retainer has is a high coefficient of friction material having a static coefficient of friction of about 0.5 or higher and preferably about 0.7 or higher, and more preferably about 0.9 or higher, according to ASTM 1894, when tested against a metal surface, such as aluminum, or an aluminum sheet or plate. A friction tester, FPT-H1, available from Mecmesin Limited, UK, may be used to perform the friction testing according to ASTM 1894 to determine the static coefficient of friction of the perimeter retainer material with a metal surface, such as aluminum. An exemplary perimeter retainer is a resilient material such as a foam or elastomeric material that returns to an original shape or form after a deforming force is removed. For example, an exemplary resilient material may be deformed by being compressed in thickness, wherein the material is compressed to about 75% of an original thickness and held in a compressed state for about 1 minute and the material will return substantially to an original thickness within about 5 minutes, wherein substantially the original thickness is within about 90% of the original thickness.

An exemplary method of erecting a bowed barrier across a passageway comprises providing a barrier as described herein and bowing the barrier, or barrier panel along the width to create a convex and concave side and placing the bowed barrier across a passageway with the left side contacting the left passageway support and the right side contacting the right passageway support.

A passageway, as used herein, is a doorway, a hallway, a stairway and the and passageway for people or pets having a left and right support.

The summary of the invention is provided as a general introduction to some of the embodiments of the invention and is not intended to be limiting. Additional example embodiments including variations and alternative configurations of the invention are provided herein.

BRIEF DESCRIPTION OF SEVERAL VIEWS OF THE DRAWINGS

The accompanying drawings are included to provide a further understanding of the invention and are incorporated in and constitute a part of this specification, illustrate embodiments of the invention, and together with the description serve to explain the principles of the invention.

Corresponding reference characters indicate corresponding parts throughout the several views of the figures. The figures represent an illustration of some of the embodiments of the present invention and are not to be construed as limiting the scope of the invention in any manner. Further, the figures are not necessarily to scale, some features may be exaggerated to show details of particular components. Therefore, specific structural and functional details disclosed herein are not to be interpreted as limiting, but merely as a representative basis for teaching one skilled in the art to variously employ the present invention.

DETAILED DESCRIPTION OF THE ILLUSTRATED EMBODIMENTS

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Also, use of "a" or "an" are employed to describe elements and components described herein. This is done merely for convenience and to give a general sense of the scope of the invention. This description should be read to include one or at least one and the singular also includes the plural unless it is obvious that it is meant otherwise.

Certain exemplary embodiments of the present invention are described herein and are illustrated in the accompanying figures. The embodiments described are only for purposes of illustrating the present invention and should not be interpreted as limiting the scope of the invention. Other embodiments of the invention, and certain modifications, combinations and improvements of the described embodiments, will occur to those skilled in the art and all such alternate embodiments, combinations, modifications, improvements are within the scope of the present invention.

Definitions

A convex side of a bowed barrier or barrier panel is the side having a convex shape across the width, or bowed outward.

A convex side of a bowed barrier or barrier panel is the side having a convex shape across the width, or bowed inward.

Substantially rectangular, as used herein, refers to a barrier or barrier panel that has a substantially parallel top and bottom and substantially parallel left and right side along at least a portion of the left and right side. A barrier or barrier panel that is substantially rectangular in shape may comprise baseboard indentation as shown and described herein.

Figure 1:
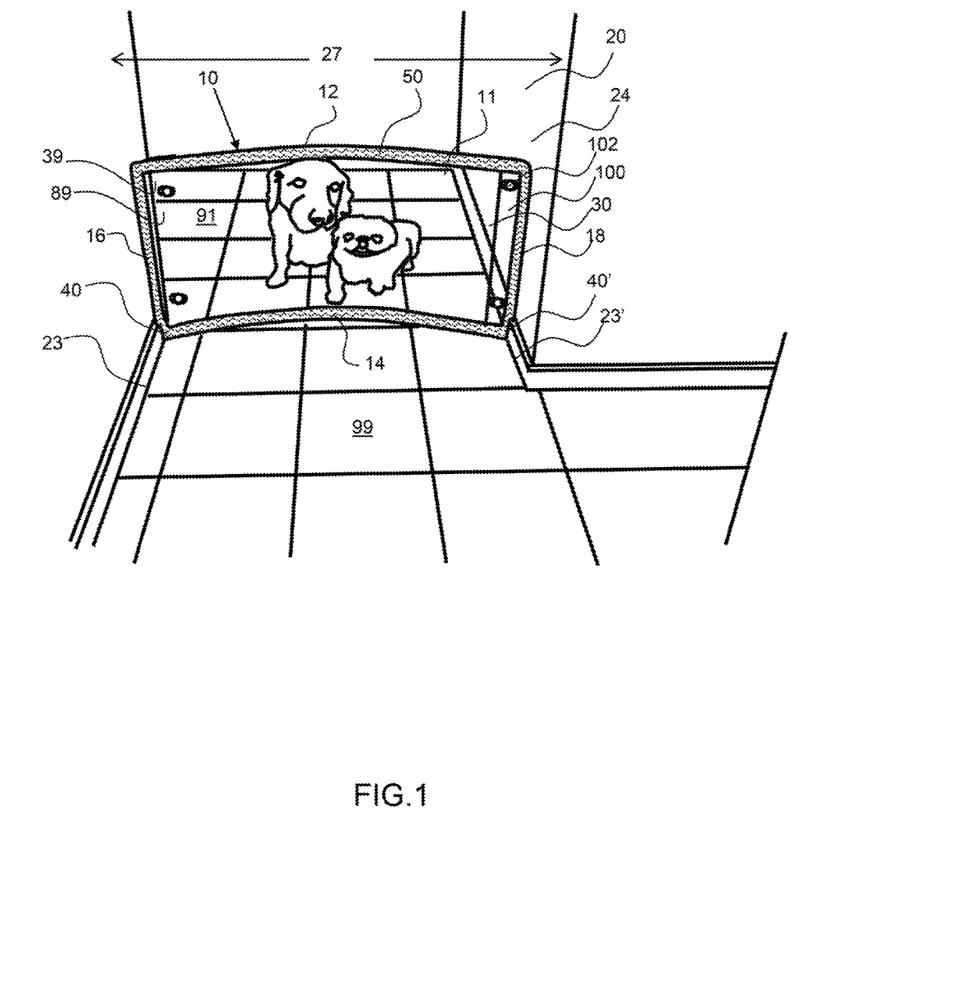
FIG. 1 shows a perspective view of an exemplary barrier configured in a hallway and preventing dogs from entering into an excluded area.

As shown in FIG. 1, an exemplary barrier 10 is configured in a hallway 24 type passageway 20 and is preventing dogs from entering into an exclusion area 99. The dogs are retained in the barrier area 91 by the bowed barrier 11 secured across the width 27 of the passageway and secured to the left support 26 and right support 28 of the passageway 20. The left side 16 and right sides 18 of the barrier are secured to the left support and right support of the passageway by the perimeter retainer 50, such as a resilient foam. An extender portion 100 is configured on the right side of the barrier panel 30 and is secured to the barrier panel by fastener that extends through the extension slot 102 in the barrier panel for adjustment of the width of the barrier panel. The barrier panel 30 is bowed and held in place across the passageway by the resilient perimeter retainer 50. The bowed barrier 11 has a barrier side, or the convex side facing the dogs or the barrier area 91 and an exclusion side 39, or concave side 89, facing the exclusion area 99. The barrier has a top 12, bottom 14, left side 16 and right side 18. The barrier panel has baseboard indentations 40, 40' extending up from the bottom 14 and along the left side 16 and right side 18 respectively. The baseboard indentations enable the bowed barrier 11 to fit snuggly against the left and right supports of the passageway and around the baseboards 23, 23'.

Figure 2:
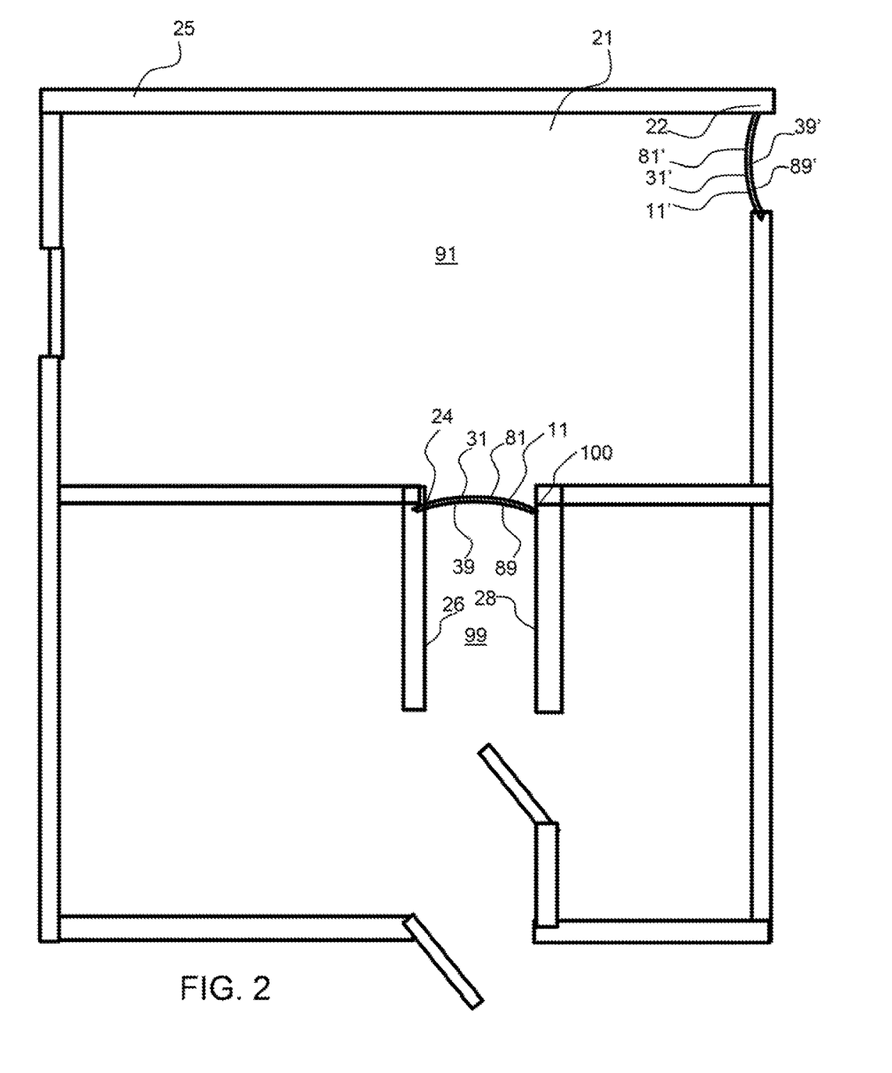
FIG. 2 shows a schematic of a room in a dwelling having two exemplary barriers erected in a hallway and doorway.

As shown in FIG. 2, a dwelling 25, such as a home, has a pair of barriers 10, 10' configured across passageways 20, 20', to create a barrier area 91 and an exclusion area 99. The barrier area 91 is a room 21, such as the kitchen, and dogs or children are excluded from the exclusion area 99 which may be other areas of the home or outdoors. A first bowed barrier 11 is secured across a hallway 24 with the barrier side 31, or convex side 81 facing the barrier area 91 and the convex side 89 or exclusion side 39 facing the exclusion area 99. The bowed barrier is secured along the left support 26 and right support 28, or walls of the hallway 24. A second bowed barrier 11' is configured across a doorway 22 with the barrier side 31' or convex side 81' facing the barrier area 91 and the concave side 89' or exclusion side 39' facing an exclusion area 99', outdoors.

Figure 3:
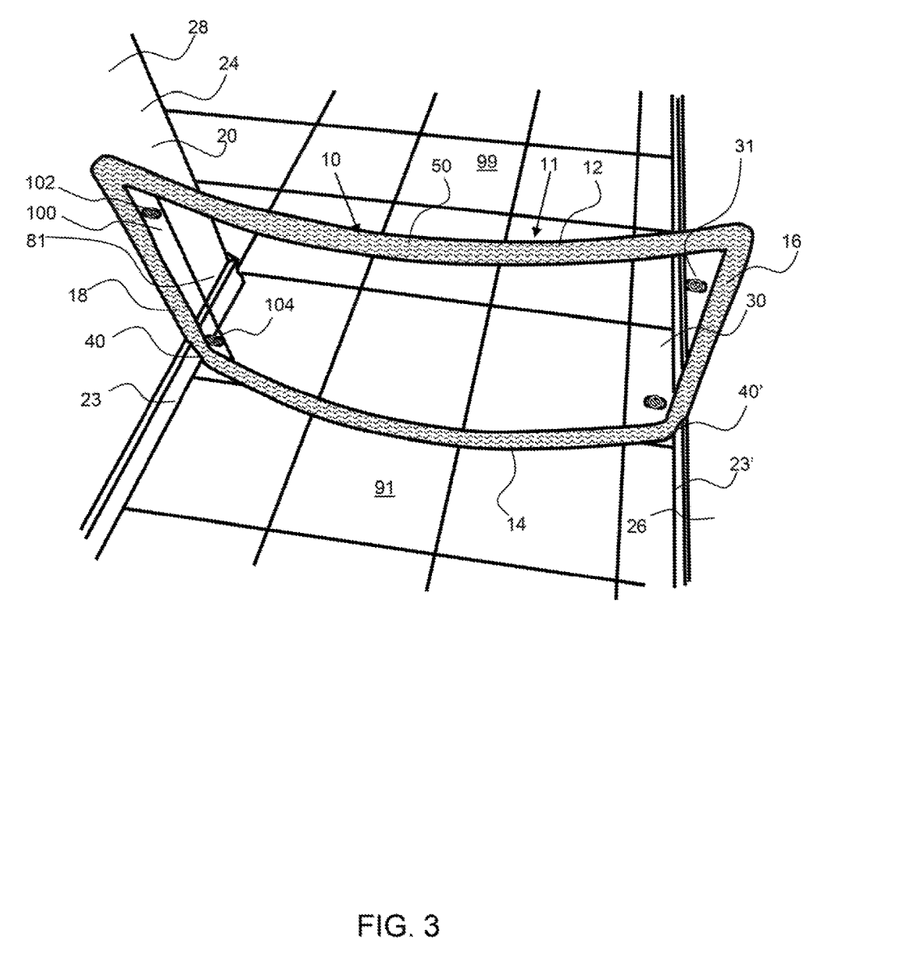
FIG. 3 shows a perspective view of an exemplary barrier configured in a hallway.

As shown in FIG. 3, an exemplary barrier 10 is configured in a hallway 24 type passageway 20 to prevent animals or children from entering into an exclusion area 99. Animals or children will be retained in the barrier area 91 by the bowed barrier 11 secured across the passageway and secured to the left support 26 and right support 28 of the passageway 20. An extender portion 100 is configured on the right side 18 of the barrier panel 30 and is secured to the barrier panel by a fastener 104 that extends through the extension slot 102 in the barrier panel for adjustment of the width of the barrier panel. The left side 16 and right sides 18 of the barrier are secured to the left support 26 and right support 28 of the passageway by the perimeter retainer 50, such as a resilient foam. The barrier panel 30 is bowed and held in place across the passageway by the resilient perimeter retainer 50. The bowed barrier 11 has a barrier side 31, or the convex side 81 facing the barrier area 91 and an exclusion side, or concave side, facing the exclusion area 99. The barrier panel has baseboard indentations 40, 40' extending up from the bottom 14 and along the left side 16 and right side 18 respectively. The baseboard indentations enable the bowed barrier 11 to fit snuggly against the left and right supports of the passageway and around the baseboards 23, 23'.

Figure 4:
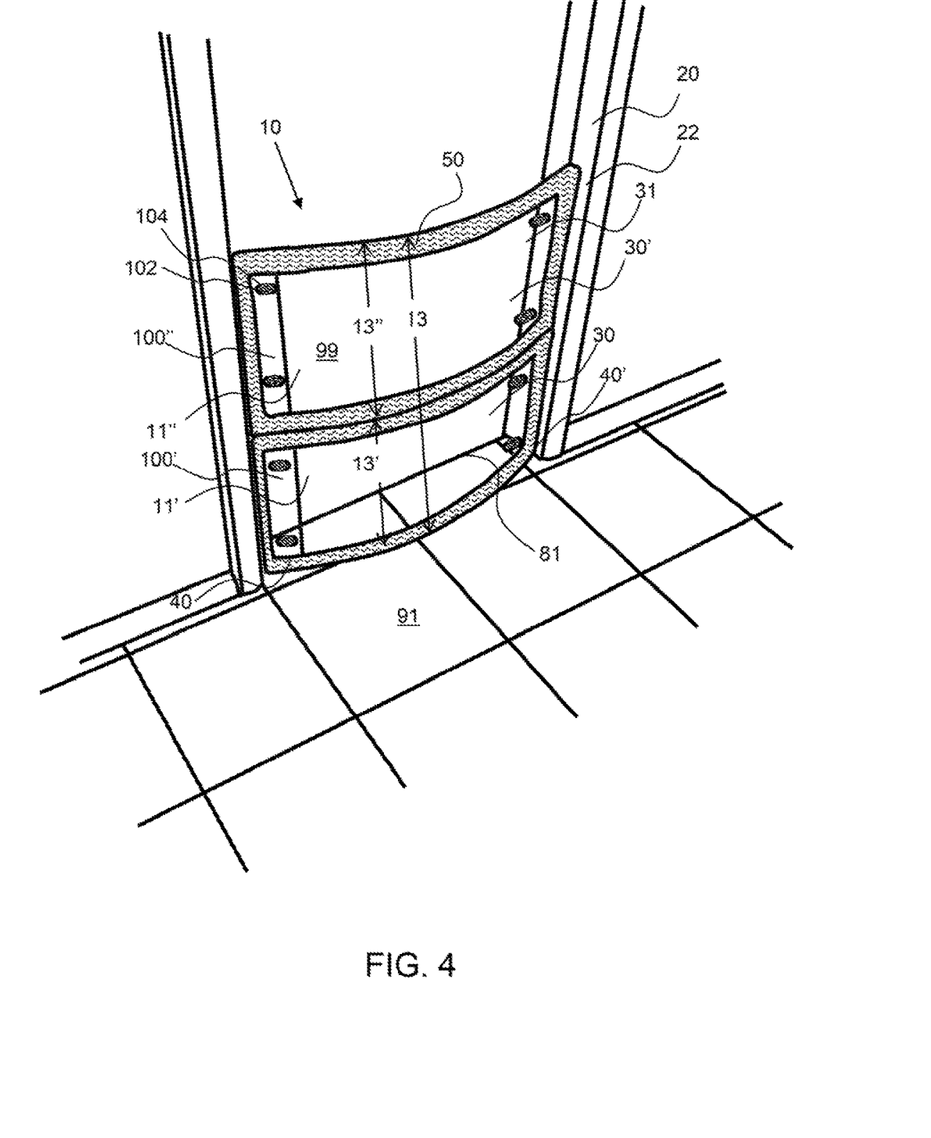
FIG. 4 shows a perspective view of an exemplary barrier configured in a doorway with a first and second barrier configured one atop the other.

As shown in FIG. 4, a first bowed barrier 11' is configured along a bottom portion of a passageway and a second bowed barrier 11" is configured above the first bowed barrier to produce a barrier 10 having a height 13. The first bowed barrier 11' has a height 13' extending from the floor up along the doorway 22 and the second bowed barrier 11" has a height 13" from the top of the first bowed barrier up to the top of the second bowed barrier. A gap may be configured between the first and second bowed barrier as well. This may allow a dog to look into the exclusion area 99 from the barrier area 91, for example. Also, each of the barrier panels comprise an extender portion 100 that is secured to the barrier panel by a fastener 104 that extends through the extension slot 102 in the barrier panel for adjustment of the width of the barrier panel.

Figure 5:
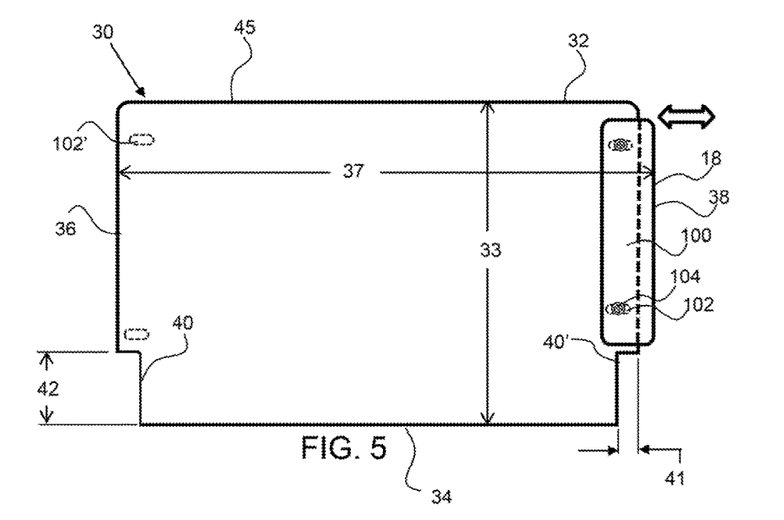
FIG. 5 shows a front view of an exemplary barrier panel having baseboard indentations configured along the bottom of each side.

As shown in FIG. 5, an exemplary barrier panel 30 is a substantially rectangular having a top 32 and bottom 34 that extend substantially parallel with each other and a left side 36 and right side 38 that extend substantially parallel with each other. The exemplary substantially rectangular barrier panel 30 has baseboard indentations 40, 40' extending inward along the bottom of each of the left and right sides. The baseboard indentations have an indentation depth 41 in from the sides and an indentation height 42 measured up from the bottom of the barrier panel. The barrier panel has a width 37 and a height 33. The indentation panel may be a translucent or transparent sheet of material, such as plastic. The barrier panel may be a sheet of polycarbonate, for example, having a thickness to allow the panel to be bowed and retained across a passageway. An extender portion 100 is configured on the right side 18 of the barrier panel 30 and is secured to the barrier panel by a fastener 104 that extends through the extension slot 102 in the barrier panel for adjustment of the width of the barrier panel.

Figure 6:
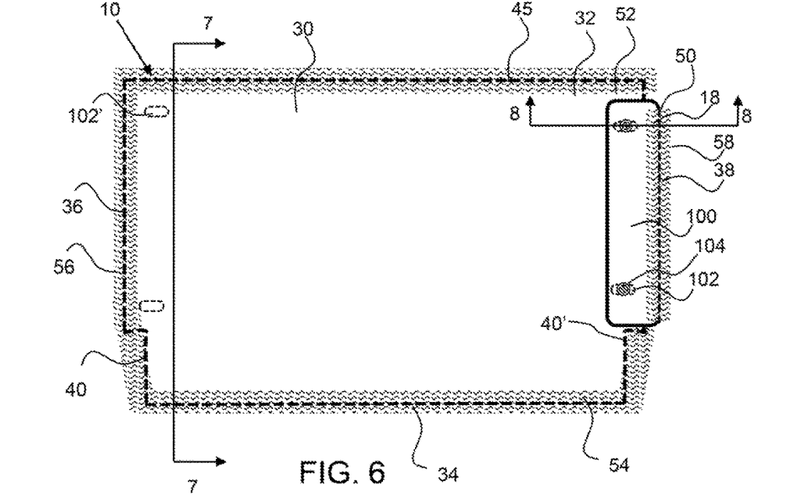
FIG. 6 shows a front view of an exemplary barrier having a barrier panel with baseboard indentations configured along the bottom of each side and a perimeter retainer extending around the perimeter of the barrier panel.
Figures 7, 8:
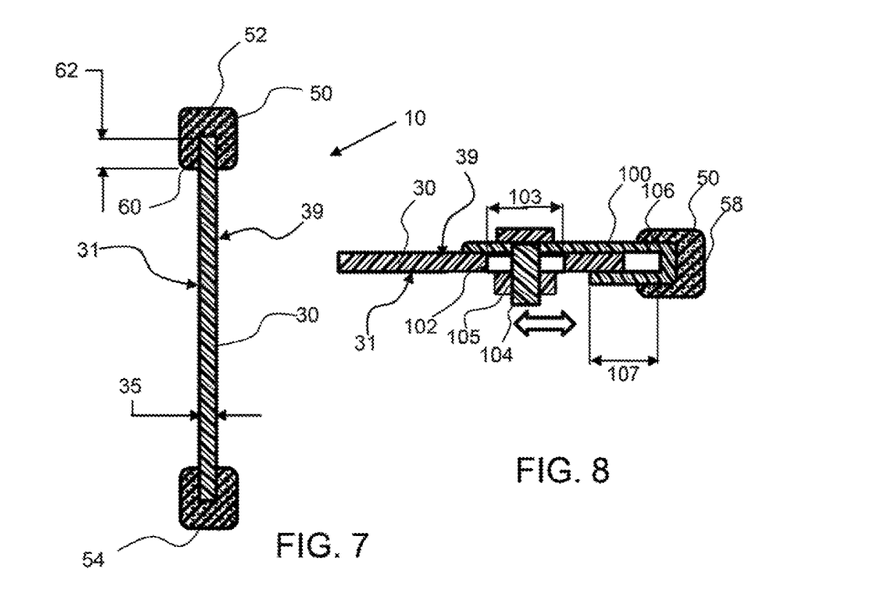
FIG. 7 shows a cross-sectional view along line 7-7 of FIG. 6 of the barrier.
FIG. 8 shows a cross-sectional view along line 8-8 of FIG. 6 of the barrier.

As shown in FIG. 6, The barrier panel 30 of FIG. 5 has a perimeter retainer 50 configured around the outer perimeter 45 of the barrier panel 30. As shown in FIG. 7, the perimeter retainer 50 has a perimeter channel 60 having a channel depth 62 to receive the barrier panel 30. The perimeter retainer has a top portion 32 that extends along the top side of the barrier panel, a bottom portion 34 that extends along the bottom side of the barrier panel, a left side portion 36 that extends along the left side of the barrier panel and a right side portion 38 that extends along the right side of the barrier panel, or along the outer edge of the extender portion 100. An extender portion 100 is configured on the right side 18 of the barrier panel 30 and is secured to the barrier panel by a fastener 104 that extends through the extension slot 102 in the barrier panel for adjustment of the width of the barrier panel. The perimeter retainer may extend along the baseboard indentation as shown. However, the perimeter retainer may extend along the left and right sides but not along the baseboard indentation. Also, the perimeter retainer may only extend along the left and right sides and not along the top and bottom sides of the barrier panel. As described herein however, a perimeter retainer along the bottom may provide some additional resistance to dislodging the bowed barrier.

As shown in FIG. 7, the barrier panel 30 extends into the perimeter channel 60 of the perimeter retainer 50. The barrier panel has a thickness 35 and is a planar sheet of material that can be bowed to create a bowed barrier.

As shown in FIG. 8, an extender portion 100 is configured around the barrier panel 30. The extender portion has an extender channel 106 that slides down over the side of the barrier panel. A fastener 104, such as a bolt, extends through the extender portion 100 from a barrier side 31 to and exclusion side 39 and a fastener retainer 105, such as a nut secures the fastener retainer to the barrier panel 30. The extension slot 102 in the barrier panel 30 enables the extender portion 100 to be slid or adjusted in the width direction and then secured in position by the fastener and fastener retainer to secure the extender portion to the barrier panel. Note that the extension channel is long enough to allow the extender portion to be slid and adjusted along the extension slot. The extender portion may have an extension channel depth 107, and the barrier panel may have an extension slot width 103, that enables a width adjustment of 25 mm or more, about 50 mm or more, about 75 mm or more, about 150 mm or more and any range between and including the width adjustment values provided.

Figure 9:
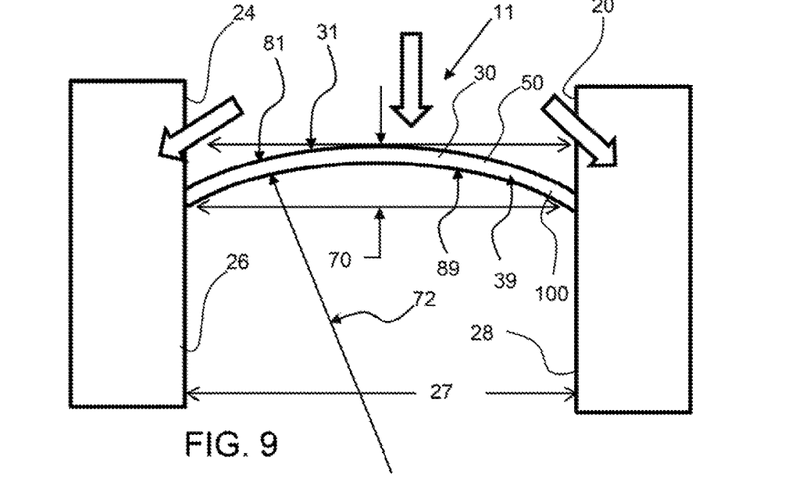
FIG. 9 shows a top-down view of an exemplary barrier bowed and retained in a hallway and having a barrier side and an exclusion side.

As shown in FIG. 9, the exemplary bowed barrier 11 is retained in a hallway 24 and has a barrier side 31 and an exclusion side 39. The bowed barrier 11 has a convex side 81 and a concave side 89 and the bowed barrier 11 has residual stress that creates a force, as indicated by the bold arrows pointing toward the left support 26 and right support 28 of the passageway 20. A force exerted on the barrier side 31 of the bowed barrier 11 will increase the force of the bowed barrier on the left and right supports as the force will act to straighten the bowed barrier. The width of the bowed barrier is greater than the width of the passageway 27. The bow offset 70, or the distance from the straight line between the contact points of the bowed barrier 11 with the passageway to the outermost point on the convex side 31 of the bowed barrier may be enlarged or reduced depending on the difference in the width of the barrier and the width of the passageway. A greater difference in these widths will result in a greater bow offset distance or a reduced radius of curvature 72. A bowed barrier 11 therefore can be used in a range of passageways having variable widths.

It will be apparent to those skilled in the art that various modifications, combinations and variations can be made in the present invention without departing from the scope of the invention. Specific embodiments, features and elements described herein may be modified, and/or combined in any suitable manner. Thus, it is intended that the present invention cover the modifications, combinations and variations of this invention provided they come within the scope of the appended claims and their equivalents.

What is claimed is:

1. A method of erecting a bowed barrier across a passageway comprising the steps of:
    a) providing a substantially rectangular barrier panel comprising:
        a thickness;
        a top;
        a bottom;
        a left side;
        a right side;
        an outer perimeter;
        a left side baseboard indentation and right side baseboard indentation, each having an indentation depth and an indentation height;
        wherein the left side baseboard indentation extends from the bottom on the left side toward the top of the barrier panel and wherein the right side baseboard indentation extends from the bottom on the right side toward the top of the barrier panel;
        wherein the barrier panel has a first width above the baseboard indentations and a second width between the baseboard indentations, wherein the first width is greater than the second width;
        wherein the barrier panel includes a perimeter retainer attached to at least the left side and the right side of said barrier panel and comprising a resilient material;
        wherein the barrier panel is flexible;
    b) bowing the barrier panel to create a vertically bowed barrier panel having a vertical convex side and a vertical concave side;
    c) placing the bowed barrier panel in said passageway so that the perimeter retainer is pressed against a left side and a right side of said passageway to secure the bowed barrier panel in and across said passageway; and wherein at least one of the left side and right side of the passageway comprises a baseboard, and
    d) locating at least one of said left side and right side baseboard indentations over said baseboard when placing the bowed barrier panel across the passageway.

2. The method of erecting a bowed barrier across a passageway of claim 1, wherein the passageway is a hallway.

3. The method of erecting a bowed barrier across a passageway of claim 1, wherein the barrier panel is translucent.

4. The method of erecting a bowed barrier across a passageway of claim 1, wherein the barrier panel is a plastic.

5. The method of erecting a bowed barrier across a passageway of claim 1, wherein the indentation height of each of the left and right side baseboard indentations is between 100 mm and 25 cm.

6. The method of erecting a bowed barrier across a passageway of claim 1 wherein the indentation height of each of the left and right side baseboard indentations is between 150 mm and 25 cm.

7. The method of erecting a bowed barrier across a passageway of claim 1, wherein the indentation depth of each of the left and right side baseboard indentations is at between 10 mm and 35 mm.

8. The method of erecting a bowed barrier across a passageway of claim 1, wherein the perimeter retainer is a foam.

9. The method of erecting a bowed barrier across a passageway of claim 1, wherein the perimeter retainer extends completely around the outer perimeter of the barrier panel.

10. The method of erecting a bowed barrier across a passageway of claim 1, wherein the perimeter retainer comprises a perimeter channel and wherein the barrier panel extends into the perimeter channel.

11. The method of erecting a bowed barrier across a passageway of claim 1, wherein the barrier panel comprises an extender portion detachably attached to the barrier panel.

\* \* \* \* \*